Patented Sept. 8, 1942

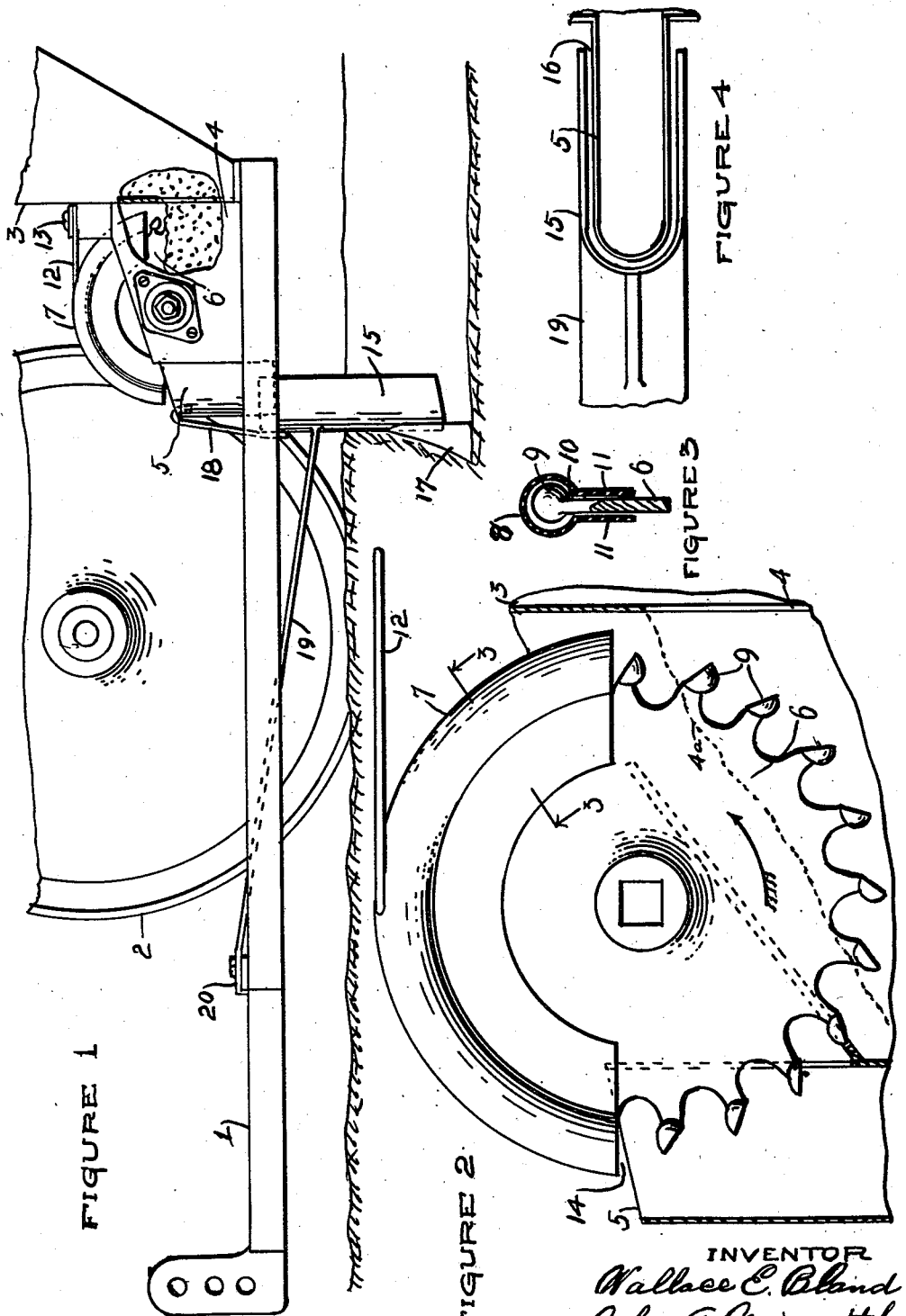

2,295,380

UNITED STATES PATENT OFFICE 2,295,380

PLANTER

Wallace E. Bland, San Jose, Calif.

Application August 20, 1940, Serial No. 353,395

1 Claim. (Cl. 221—135)

The present invention relates particularly to a machine for the planting of seed in rows, the word "seed" being used in its broadest sense to include beans and the like, and more particularly to that portion of the machine which receives the seed from a hopper and deposits it in the soil.

Since the development of the invention has been accomplished in the planting of beans, particular reference will be made to that type of seed in the following disclosure.

The type of planter now commonly in use, and to which the present invention particularly applies, comprises a continually rotating disc provided with annularly spaced cups disposed about its perimeter and designed to pick up the beans, one at a time, from a supply chamber, and deposit them in the soil uniformly spaced in a row.

But in actual practice the above indicated desired result is not obtained. Each cup will invariably pick up a bean as it ascends through the supply chamber, but after it has passed above the top level of the supply mass the slightest jar will sometimes dislodge the bean thereon, causing it to fall back into the general mass. Likewise, when the beans are carried over the top of the arc through which they travel the operation of the machine may cause a number of the beans to be dislodged at the same time, causing them to be deposited in the soil in close proximity to each other. The result is, that a very heavy loss is sustained by the planter of a large acreage because a very material percentage of the soil is unproductive due to the failure of the machine to properly space the beans, or to unfailingly deposit the beans at regular intervals. This loss is increased by the clumping of the beans as hereintofore described, such clumping or grouping of the beans resulting in weakened plants if not thinned out.

It is, therefore, one object of the present invention to provide means whereby the machine will be caused to plant the seed one at a time to form regular, unbroken rows of equally spaced seed.

It is another object of the invention to provide means of the character indicated that will permit positioning of the planting mechanism close to the soil, and that will readily accommodate itself to any character of soil.

Finally it is an object of the invention to provide means of the character indicated that will be economical to manufacture, simple in form and construction, strong, durable, and highly efficient in its practical application.

In the drawing:

Figure 1 is a side elevation of a portion of a planter embodying my invention.

Figure 2 is an enlarged elevation of the planter disc fitted with the hood forming a part of my invention, parts of the associated structure being broken away.

Figure 3 is a sectional view on line 3—3 of Figure 2.

Figure 4 is a detail illustration showing the relative positions of the fixed feeding chute and my improved floating chute.

Referring more particularly to the drawing, the general framework of the planter is indicated by the numeral 1, a wheel being indicated in part at 2 to show its position relative to the planting device.

Mounted on the frame 1 is the hopper 3, the supply bin 4 and the fixed feed chute 5. Operatively mounted with respect to the supply bin 4 and the fixed feed chute 5 is the feeding disc 6. Inasmuch as these parts are in common use they will not be described in detail. The seed flows into the bin 4 as at 4a.

In effecting one portion of my invention I provide an arcuate rubber hood indicated generally at 7. The form of this hood is shown clearly in Figure 3, the central portion being tubular in form as at 8, and of a size to not-too-closely encompass the cups 9 on the disc 6. Along its inner periphery the hood is provided with a slot 10 and inwardly extending flanges 11 projecting from the edges of the slot.

In use, this hood 7 is placed on the disc 6 as shown with the flanges 11 seated against opposite sides of the disc, and the tubular portion 8 forming a restricted passage for the cups 9. The hood is held against rotation with the disc by means of a strap portion 12 formed integrally therewith and attached to a nonrotating portion of the structure as at 13.

In the above described assembly when a seed is picked up in a cup 9 it is carried into the tube 8, and it is retained in the cup by the encompassing tube until it is discharged at 14 regardless of the vibration or jolting to which the disc 6 may be subjected, and consequently the seed are discharged into the chute 5 at regular spaced intervals governed by the spacing of the cups on the disc and by the speed of rotation of the disc.

When the seed has entered the fixed chute 5 it must still be conveyed to its proper position in the soil, and this I accomplish in the following manner.

I provide a floating chute 15 similar to chute 5 in cross-section but somewhat larger and entirely open in the rear as at 16 so that its upper end may fit loosely over chute 5 as shown in Figure 4 and be quite free to move relative thereto. This chute 15 has a shoe 17 mounted on its lower end to facilitate its movement through the soil and is partly supported by means of a hook 18 mounted on its upper end and adapted to engage the top edge of the chute 5 as shown.

Connected to the upper forward portion of chute 15 is a resilient bar 19 having its forward end fixedly mounted on frame 1 as at 20, but it may be adjusted at this point to permit setting the chute according to the character of the soil on which it operates.

By mounting the straight vertical chute 15 in the manner described it has considerable freedom of action enabling it to adjust itself automatically to any slight obstacle without obstructing the falling seed. The resilient bar 19 permits a limited rising and falling movement, while the hook 18, or whatever supporting device is used, prevents it from digging in. At the same time its loose fitting about chute 5 permits a limited swinging movement laterally, again without obstructing the falling seed.

The placing of the wheels 2 in the position shown relative to the seed feeding mechanism permits lowering the machine to a point adjacent the ground and materially shortens the distance through which the seed must fall, and consequently the seed falls more accurately in rows.

Although but one specific embodiment of the invention has been herein illustrated and described, it will be understood that various alterations in the details of construction and mode of assembly and operation may be made without departing from the scope of the invention as indicated in the accompanying claim.

I claim:

In a device of the character described, the combination with a seed supply bin, a seed receiving chute, and a seed transporting disc having a plurality of substantially circular cups mounted peripherally thereon and operative to transport seed from said bin to said chute; of an arcuate tube formed to substantially encompass said cups between said bin and said chute and having a longitudinal slot formed in its inner side to form a passage for the cup mountings, said slot having inwardly directed flanges formed on either edge thereof to overlie the sides of the disc, and a strap connecting the tube and bin to prevent rotation of the tube.

WALLACE E. BLAND.